(12) United States Patent
Duke et al.

(10) Patent No.: US 12,360,780 B2
(45) Date of Patent: Jul. 15, 2025

(54) SYSTEMS AND METHODS OF MULTI-STAGE CONFIGURATION SERVICE FOR POLICY-DRIVEN TRANSFORMATION

(71) Applicant: Open Text SA ULC, Halifax (CA)

(72) Inventors: Jeremy Duke, Gilbert, AZ (US); James Worthington Martin, Phoenix, AZ (US); Bradford Stanley Morris, Peoria, AZ (US)

(73) Assignee: OPEN TEXT SA ULC, Halifax (CA)

( * ) Notice: Subject to any disclaimer, the term of this patent is extended or adjusted under 35 U.S.C. 154(b) by 0 days.

(21) Appl. No.: 18/615,840

(22) Filed: Mar. 25, 2024

(65) Prior Publication Data

US 2024/0264848 A1    Aug. 8, 2024

Related U.S. Application Data

(63) Continuation of application No. 17/533,702, filed on Nov. 23, 2021, now Pat. No. 11,977,901, which is a continuation of application No. 16/415,882, filed on May 17, 2019, now Pat. No. 11,210,107.

(51) Int. Cl.
| | |
|---|---|
| *G06F 9/445* | (2018.01) |
| *G06F 9/54* | (2006.01) |
| *G06F 11/07* | (2006.01) |
| *G06F 40/189* | (2020.01) |

(52) U.S. Cl.
CPC ............ *G06F 9/44505* (2013.01); *G06F 9/54* (2013.01); *G06F 11/0784* (2013.01); *G06F 40/189* (2020.01)

(58) Field of Classification Search
None
See application file for complete search history.

(56) References Cited

U.S. PATENT DOCUMENTS

| | | | | |
|---|---|---|---|---|
| 8,464,242 | B2* | 6/2013 | Lanner | G06F 9/44505 717/170 |
| 8,788,931 | B1* | 7/2014 | Chen | G06F 17/00 715/234 |
| 2004/0205732 | A1* | 10/2004 | Parkinson | G06F 40/154 717/136 |
| 2006/0143146 | A1* | 6/2006 | Bognar | G06F 9/44505 |
| 2006/0168152 | A1* | 7/2006 | Soluk | H04L 63/105 709/220 |

(Continued)

*Primary Examiner* — Howard Cortes
(74) *Attorney, Agent, or Firm* — Sprinkle IP Law Group

(57) ABSTRACT

A multi-stage configuration service running in a cloud computing environment receives a transformation request from a client device. Based on a policy identified in the transformation request, the multi-stage configuration service constructs a configuration file containing key-value pairs representing settings of a requested transformation. The settings are set or constrained in accordance with zero or more facets contained in the policy that describe how an application feature is set or constrained in performing a transformation on a source file or files. The multi-stage configuration service determines, in accordance with the policy, whether the configuration file is structurally correct in view of a user-provided overriding property value and either enqueues the configuration file for a publishing agent in the cloud computing environment to perform the requested transformation or returns an error report to the client device.

20 Claims, 6 Drawing Sheets

(56) References Cited

U.S. PATENT DOCUMENTS

| | | | | |
|---|---|---|---|---|
| 2007/0143320 A1* | 6/2007 | Gaurav | ................ | G06Q 20/14 |
| 2008/0183746 A1* | 7/2008 | Gutjahr | .................. | H04L 43/00 707/999.102 |
| 2014/0310320 A1* | 10/2014 | Chen | ...................... | G06F 17/00 707/809 |
| 2016/0308914 A1* | 10/2016 | Lim | ........................ | G06F 16/13 |
| 2018/0181632 A1* | 6/2018 | Zarum | ................. | G06F 16/254 |
| 2020/0233877 A1* | 7/2020 | Patel | .................. | G06F 16/2282 |
| 2020/0242125 A1* | 7/2020 | Marthala | .................. | G06F 8/51 |
| 2020/0264902 A1* | 8/2020 | Driesen | .............. | G06F 9/44505 |

* cited by examiner

| SETTING | POLICY | TARGET APPLICATION | CONFIG SERVICE | SCHEMA TO USE |
|---|---|---|---|---|
| NO VERSION RANGE | SINGLE VERSION | | | POLICY VERSIONS |
| | MULTIPLE VERSIONS | SINGLE VERSION | | APPLICATION'S VERSION PER SETTING |
| | | MULTIPLE VERSIONS | | APPLICATION'S LATEST VERSION PER FACET |
| | | NO VERSIONS | SINGLE VERSION | SERVICE VERSIONS |
| | | | MULTIPLE VERSIONS | LATEST SERVICE VERSIONS |
| | | | NO VERSIONS | NONE |
| | NO VERSIONS | SINGLE VERSION | | LATEST APPLICATION'S VERSION |
| | | MULTIPLE VERSIONS | | APPLICATION'S LATEST VERSION |
| | | NO VERSIONS | SINGLE VERSION | SERVICE VERSION |
| | | | MULTIPLE VERSIONS | LATEST SERVICE VERSION |
| | | | NO VERSIONS | NONE |
| VERSION RANGE | SINGLE VERSION | | | POLICY VERSIONS |
| | MULTIPLE VERSIONS | SINGLE VERSION | | APPLICATION'S VERSION PER SETTING |
| | | MULTIPLE VERSIONS | | APPLICATION'S LATEST VERSION PER FACET |
| | | NO VERSIONS | SINGLE VERSION | SERVICE VERSIONS PER FACET AND SETTING |
| | | | MULTIPLE VERSIONS | LATEST SERVICE VERSIONS PER FACET AND SETTING |
| | | | NO VERSIONS | NONE |
| | NO VERSIONS | SINGLE VERSION | | LATEST APPLICATION'S VERSION |
| | | MULTIPLE VERSIONS | | APPLICATION'S LATEST VERSION |
| | | NO VERSIONS | SINGLE VERSION | SERVICE VERSIONS PER SETTING |
| | | | MULTIPLE VERSIONS | LATEST SERVICE VERSIONS PER SETTING |
| | | | NO VERSIONS | NONE |

FIG. 4A

| SETTING | POLICY | TARGET APPLICATION | SCHEMA TO USE |
|---|---|---|---|
| NO VERSION RANGE | NO VERSIONS | NO VERSIONS | NONE |
| | SINGLE VERSION | SINGLE VERSION | APPLICATION VERSION |
| | | MULTIPLE VERSIONS | LATEST APPLICATION VERSION |
| | MULTIPLE VERSIONS | * | FACET VERSION |
| | | NO VERSIONS | NONE |
| | | SINGLE VERSION | APPLICATION VERSION |
| | | MULTIPLE VERSIONS | LATEST APPLICATION VERSION PER FACET |
| VERSION RANGE | NO VERSIONS | NO VERSIONS | NONE |
| | | SINGLE VERSION | APPLICATION'S VERSION PER SETTING |
| | | MULTIPLE VERSIONS | APPLICATION'S LATEST VERSION PER SETTING |
| | SINGLE VERSION | * | FACET VERSION |
| | MULTIPLE VERSIONS | NO VERSIONS | NONE |
| | | SINGLE VERSION | APPLICATION'S VERSION PER SETTING |
| | | MULTIPLE VERSIONS | APPLICATION'S LATEST VERSION PER FACET |

FIG. 4B

SYSTEMS AND METHODS OF MULTI-STAGE CONFIGURATION SERVICE FOR POLICY-DRIVEN TRANSFORMATION

CROSS-REFERENCE TO RELATED APPLICATION(S)

This application is a continuation of, and claims a benefit of priority under 35 U.S.C. § 120 from, U.S. patent application Ser. No. 17/533,702, filed Nov. 23, 2021, issued as U.S. Pat. No. 11,977,901, entitled "SYSTEMS AND METHODS OF MULTI-STAGE CONFIGURATION SERVICE FOR POLICY-DRIVEN TRANSFORMATION," which is a continuation of, and claims a benefit of priority under 35 U.S.C. § 120 from, U.S. patent application Ser. No. 16/415,882, filed May 17, 2019, issued as U.S. Pat. No. 11,210,107, entitled "SYSTEMS AND METHODS OF MULTI-STAGE CONFIGURATION SERVICE FOR POLICY-DRIVEN TRANSFORMATION," which are fully incorporated by reference herein for all purposes.

TECHNICAL FIELD

This disclosure relates generally to the field of data processing. More particularly, this disclosure relates to systems, methods, and computer program products of a multi-stage configuration service for policy-driven transformation.

BACKGROUND OF THE RELATED ART

Document transformation refers to the act of transforming a source document into one or more renditions. In an enterprise computing environment, an example of a document transformation can be routing a purchase order to a specific transformation process that includes performing a data conversion to translate certain information in the purchase order (e.g., account number, shipping address, etc.) to produce an invoice. Combining data operations and process control, the transformation process can include performing additional actions such as adding a logo at the upper right corner of the invoice, adding a watermark, etc. A rendition, therefore, often is not an exact replica of the source document.

At the high level, this transformation process seems quite straightforward. However, the details of how to transform a document into a particular rendition can be very involved and complicated. Depending on the document transformation tool, different configuration options such as value-add capabilities, value-add enhancements, etc. can be configured in a transformation. Most configuration options have various rules, policies, and requirements on a variety of property values. Adding to the complication is that different property values are often inter-related. In addition, some software applications are "integrated" into other applications. Such integrations often constrain possible configuration properties to a smaller range or set. Even then, one specific, concrete set of configuration properties may vary slightly from the next concrete set of configuration properties.

Accordingly, to perform a document transformation process, today's document transformation software commonly relies on an exhaustive description of that transformation manually created in a flat file to tailor the behavior of the document transformation software. Such a flat file can contain several dozens of user-specified key-value pairs to be used in the document transformation. This kind of "static" configuration files require manual editing in order to change a configuration property value. A completed configuration file is provided with a source document to the document transformation software (e.g., a transformation engine) for consumption. In turn, the document transformation software performs the document transformation on the source document in accordance with the user-specified configuration file and either returns a transformed document or alerts the user (who often is not the creator of the configuration file) that there is a problem with the given configuration file.

SUMMARY OF THE DISCLOSURE

An object of the invention is to eliminate the need for a user to manually create a configuration file for a document transformation (referred to hereinafter as "transformation"). Another object of the invention is to significantly reduce the time needed to discover an unacceptable configuration so that a user can be notified in seconds, instead of minutes or hours.

In embodiments disclosed herein, these and other objects of the invention can be realized by a multi-stage configuration service running in a cloud computing environment. Instead of a configuration file, the multi-stage configuration service receives a transformation request from a client device. The transformation request can be received from the client device through a web-based application or an application programming interface (API) call.

The transformation request can include or reference a source file or source files, as well as identifying information that identifies a transformation policy. The transformation policy can have zero or more facets. In this disclosure, a "facet" refers to a special data set that describes how an application feature is set or constrained in performing a transformation on a source file.

Based at least on the transformation policy, the multi-stage configuration service can construct a configuration file which contains key-value pairs representing settings of the transformation. The settings are set or constrained in accordance with the zero or more facets of the transformation policy. This construction may include determining a feature schema for the application feature, the feature schema describing a set of properties of the application feature, each property of the set of properties described by the feature schema having a type, a format, and an initial value. Further, the transformation policy can include a target application range of application versions having the application feature. In some embodiments, determining the feature schema for the application feature can include selecting a feature schema from a plurality of feature schemas by applying a feature schema selection rule or rules to an application version or range of application versions set forth in the transformation policy.

Once the configuration file is constructed, the multi-stage configuration service can determine, in accordance with the transformation policy, whether the configuration file is structurally correct. If the transformation request includes an overriding value, the multi-stage configuration service can, for instance, apply a value selection rule to the overriding value. If the overriding value is allowed, the configuration file is determined to be structurally correct. The value selection rule can be defined based on a facet of the transformation policy. There can be multiple value selection rules that are applicable to the transformation policy.

Responsive to the configuration file being structurally correct, the multi-stage configuration service can enqueue a transformation job so that an application (e.g., a publishing agent) running in the cloud computing environment and having the application feature can perform the requested transformation on the source file or source files utilizing the configuration file. Responsive to the configuration file being structurally incorrect (e.g., an overriding value is not allowed per a value selection rule), the multi-stage configuration service can generate an error report and return the error report to the client device. In this way, even though the multi-stage configuration service does not perform any transformation, it can quickly and efficiently, before a transformation job is actually performed, notify a user at the client device that the transformation request contains an error or needs more information.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIGS. 4A-4B are charts showing examples of feature schema selection rules utilized by a multi-stage configuration service disclosed herein according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Document transformation services have been used in enterprise computing environments to perform transformations and analysis on repository content. These document transformation services are often provided by on-premises systems running on server machines operating behind firewalls in a secure enterprise computing environment.

In embodiments disclosed herein, document transformation services are decomposed into different smaller services referred to as microservices. Microservices are a variant of the service-oriented architecture (SOA) architectural style. In a microservices architecture, an application is structured as a collection of loosely-coupled, separately deployable services. Compared with the traditional approach in which monolithic applications are built with all their deployable components, these loosely-coupled services are more fine-grained and thus are referred to as "micro" services or "microservices."

Figure 1:
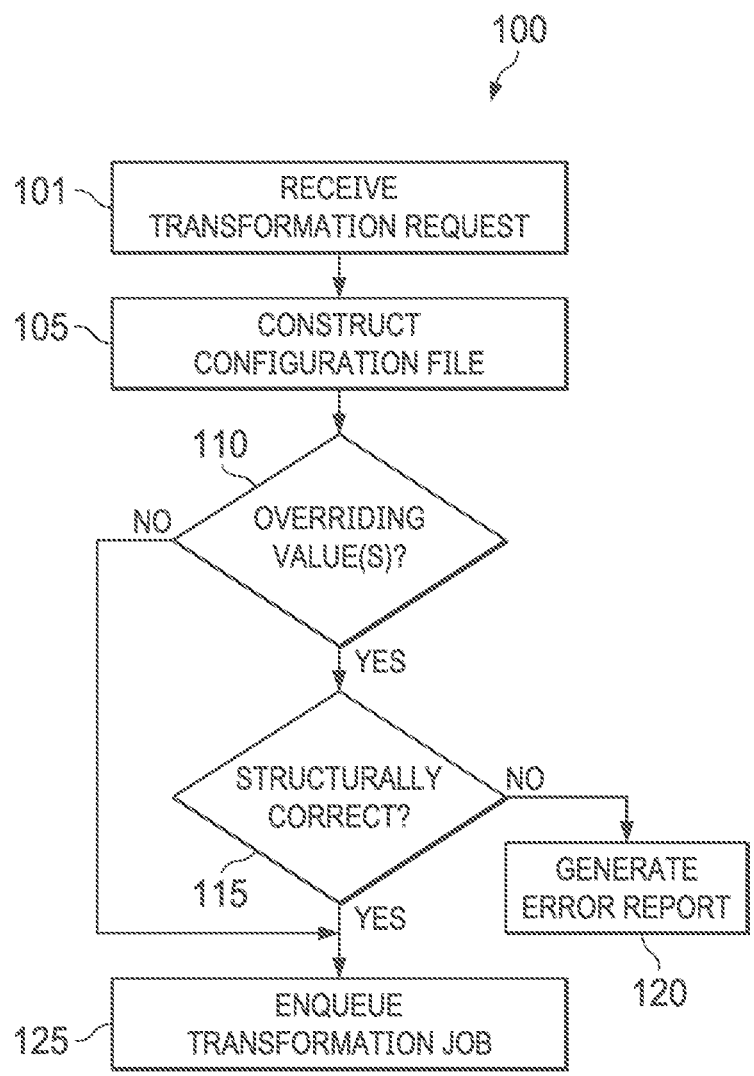
FIG. 1 is a flow chart illustrating an example of a method performed by a multi-stage configuration service running in a cloud computing environment according to some embodiments.

In embodiments disclosed herein, a new multi-stage configuration service is deployed to and run in a cloud computing environment (e.g., on a server machine operating in a data center that supplies hosted services over a private or public network). FIG. 1 is a flow chart illustrating an example of a method 100 performed by a multi-stage configuration service running in a cloud computing environment according to some embodiments.

In some embodiments, method 100 can begin with the multi-stage configuration service receiving a transformation request from a client device (101). The client device may operate in an enterprise computing environment or a network environment that is separate and independent of the cloud computing environment—the deployment platform which hosts the multi-stage configuration service.

As described above, to request a transformation, a user usually needs to provide an exhaustive set of instructions, for instance, for adding a banner at the upper left hand corner with this text, adding a banner at the upper right hand corner with that text, creating a watermark with this text, stitching one document onto the end of another document, inserting a page between these two documents, generating a table of content, adding an index, making it into a document of a different format, and so on. This kind of transformation description tends to be very involved and complicated, often resulting in several dozens of key-value pairs (settings) that would need to be manually created and individually specified in a flat file.

Unlike existing document transformation services, in embodiments disclosed herein, a user does not need to provide the multi-stage configuration service with a manually created flat file. As described below, the invention disclosed herein takes a policy-driven approach to transformation. For each individual transformation request, instead of providing all the transformation instructions in a static, manually created file, a user only needs to provide some or none of the instructions by way of identifying a policy and providing a source document (e.g., uploading the source document or a network address where the source document resides). If the user does provide some instructions for that transformation (e.g., an instruction to override a value of a property of an application feature to be performed in the transformation), the invention verifies whether such instructions conflict with rules set in the policy. For example, a rule can specify that a document being transformed must include a watermark and a value for the watermark must be specified. If a user sends a transformation request that identifies this policy, but the transformation request does not specify any value for the watermark, this transformation request can be denied before a corresponding transformation job is worked on. This is possible because, by construction, the system implementing the invention disclosed herein knows that this is not going to be a valid transformation job.

The transformation request, which can be received via a user interface (UI) from the client device through a web-based application or an API call, can contain identifying information that identifies one or more transformation policies and can include or reference a source document or source documents. A source document can be any electronic file that a user wants to transform into something else. For example, the user may want to share a confidential computer-aided design (CAD) file with Steven. Steven does not have the appropriate software to open the CAD file, so the CAD file would need to be transformed so that Steven can open the file through an appropriate software, for instance, a viewer such as a Portal Document Format (PDF) viewer.

In a source-to-target transformation process, various value addon's and enhancements can be applied by policy. Different policies can dictate how different combinations of addon's and/or enhancements are to be applied in a transformation. For example, an entity's confidential policy may require that a "confidential" watermark is placed across the top of the document. Another policy may specify that a filing number is to be added to the lower right hand corner as a banner, certain redacted words and/or markups must be "burned in" to the document, or how pages from multiple source documents could be stitched into a single PDF file, and so on.

In some embodiments, the multi-stage configuration service can provide (e.g., through a UI-based tool or mechanism on the client device) a menu of pre-defined policies. In some embodiments, the multi-stage configuration service can provide a tool (e.g., a policy editor) through which a new policy can be created, edited, reviewed, approved, and/or managed. Through the policy menu, a user can select a policy (or policies) and perhaps provide any overriding property value(s) that he wants to use. So, instead of a flat file with key-value pairs, the user only needs to provide a source document, a name of a policy he wants to use, and an overriding property value, if any. That is, a user can provide zero or more user instructions to override a predefined setting (e.g., a property value) or settings of a transformation that the user is requesting.

Following the above example, suppose the user identifies the confidential policy that requires a "confidential" watermark, but the user wants to use "Top Secret" instead of "confidential." To override the predefined setting, the user can specify a property value "Top Secret" for the watermark. Thus, in this example, the transformation request received by the multi-stage configuration service (101) would contain the source document, an identification of the confidential policy (e.g., a policy name and/or a policy identifier), and the overriding property value "Top Secret."

Before describing method 100 further, it might be helpful to define the following conceptual terms. In this disclosure, these terms are embodied as data sets with internal relationships: "Application", "Feature," "Policy," "Facet," and "Config."

Figure 2:
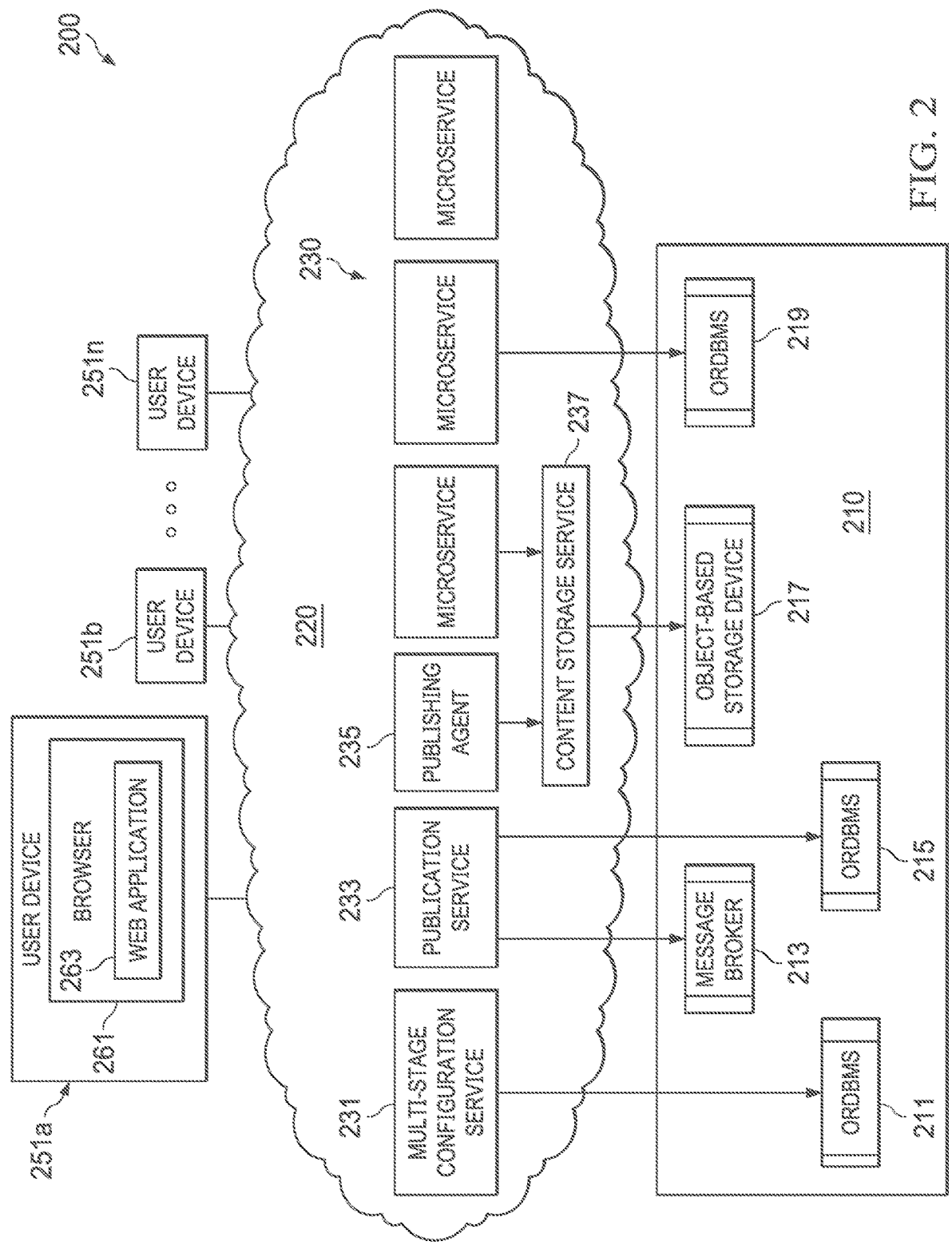
FIG. 2 depicts a diagrammatical representation of a cloud computing environment having a microservices infrastructure supporting a plurality microservices running in a cloud to provide various microservices, including a multi-stage configuration service, to client devices according to some embodiments.

An Application provides identifying information about some software, including a software version as well as references to zero or more Features, with each reference noting the optionality of each referenced Feature. An example of an Application can be a particular version of a publishing agent, which is a microservice. An example of a publishing agent 235 is shown in FIG. 2.

A Feature also has identifying information like name and version, as well as a JavaScript Object Notation (JSON) schema ("feature schema") that describes a specific set of properties. Each property, via the feature schema, may have a type, format, and initial value. A Feature, therefore, represents a set of properties related to a transformation capability, for instance, a Feature for setting a banner somewhere on a page.

A Policy has identifying information, as well as a "target" Application range as determined by a "semantic version range". For example, a Policy might target Applications with versions 1.3.4-1.8.x (and, in doing so, associate certain Application Features which, in turn, associate certain feature schemas which describe different sets of properties for the respective Features).

A Facet describes how a given Feature property is set or constrained, for instance, whether a Feature property value must not be changed, must be changed, may be changed, must not be extended with a new value, must be extended with a new value, may be extended with a new value, etc. In this disclosure, a Facet belongs to a Policy and affects Feature settings. A Policy can have zero or more Facets. As a non-limiting example, an Application can have a Feature called "Apply Watermark." A Policy can dictate that any transformation job based on this Policy will include the "Apply Watermark" Feature. The "Apply Watermark" Feature may have a string property value. A Facet of the Policy can describe that a string property value must be provided for the "Apply Watermark" Feature when the Policy is used in a transformation job.

A Config pertains to the collection of final Feature property values that satisfy both the initial Application Feature requirements (e.g., the type, form, and range) as well as any Policy Facet requirements (e.g., any change or extend requirements).

These terms are further explained below. Following the above example, subsequent to receiving the transformation request containing the source document, an identification of the policy (e.g., a policy name and/or a policy identifier), and the overriding property value (e.g., "Top Secret") (101), the multi-stage configuration service is operable to construct a corresponding job description based on the policy identified in the transformation request (105).

In some embodiments, this job description can be in the form of a configuration file. To construct this configuration file, the multi-stage configuration service is operable to interpret or parse the transformation request to obtain or extract the identification of the policy, retrieve the policy (e.g., from a data store or policy store where predefined policies are stored) using the identification of the policy, examine the policy (which may specify no versions, single version, or multiple versions), determine a target application (which may specify no versions, single version, or multiple versions) from the policy, determine features referenced by the application, determine a feature schema for each feature, obtain the feature schema which describes a set of properties for the corresponding feature, create key-value pairs for the set of properties (per feature) and store the key-value pairs in the configuration file, which can be, but is not limited to, a Java property file, a JSON text file, a Hypertext Markup Language (HTML) attribute file, an eXtensible Markup Language (XML) attribute file, etc.

In this disclosure, a configuration file constructed by the multi-stage configuration service is utilized by a publishing agent to perform a transformation, which often involves multiple stages of data operations. The keys in the key-value pairs are properties that describe what is requested to be performed on a source document (or source documents). Following the above example, the user wants a watermark feature with a value of "Top Secret." Accordingly, the configuration file constructed by the multi-stage configuration service would include a key-value pair "watermark: Top Secret." A more complicated example might be that the user only wants to apply the watermark to a certain page or a range of pages. In that case, a different key-value pair with the specific page or range of pages would be included in the configuration file. An even more complicated example might be that the user also wants to merge and combine pages from multiple source documents and/or multiple kinds of source documents, e.g., pull pages from different documents and blend them into one document in a particular way. All of these desired operations can be processed into key-value pairs and stored in the configuration file by the multi-stage configuration service. In this way, the key-value pairs can represent settings of a transformation to be performed by a publishing agent. As described above, these settings can be constrained by facets contained in a policy, allowing the policy to drive or control the transformation process.

Once a configuration file is constructed, if no overriding value(s) is/are provided in the transformation request (110), the multi-stage configuration service proceeds to have a transformation job placed in a queue (125). Otherwise, the multi-stage configuration service is operable to examine the configuration file that it has constructed and determine, in accordance with the identified policy, whether the configuration file is structurally correct (115). This examination can be done utilizing value selection rules. This is further explained below.

While the key-value pairs are created by the multi-stage configuration service to represent properties (which are described by feature schemas associated with different features) applicable to a requested transformation, a user can override a property or properties. If an overriding property value is provided (e.g., the overriding property value "Top Secret" in the example described above), the multi-stage configuration service is operable to determine if the overriding property value is allowed by the policy. If so, the overriding property value will not cause an error when the requested transformation is actually performed. If no such an error is found, the configuration file is deemed to be structurally correct.

The determination as to whether an overriding property value is allowed can be based on a facet of the policy (e.g., a transformation policy identified in a transformation request from a client device). As described above, a policy can have zero or more facets that describe how a transformation feature is set or constrained. Following the above example, the confidential policy identified in the transformation request received by the multi-stage configuration service may include a facet that describes that the property value "confidential" for the "Apply Watermark" feature must not be changed. This condition, and its consequence, described by the facet can be defined in a value selection rule.

Utilizing this value selection rule, in this example, the multi-stage configuration service may determine that the overriding property value "Top Secret" is not allowed per the confidential policy. Accordingly, the multi-stage configuration service will generate an error report (120). This error report can be communicated to the client system and the user can quickly fix the error by deleting the overriding property value and resubmit the transformation request. Once the configuration file is structurally correct, the multi-stage configuration service enqueues a transformation job which can then be picked up by a publishing agent running in the cloud computing environment to perform the transformation on the source file utilizing the configuration file (125).

Again, a policy can have zero or more facets. A facet can describe how a feature property is to be constrained or required. For example, an entity policy might mandate that a watermark must be centered on the bottom of every page as a banner and a facet of the policy can describe that the watermark must have a value (e.g., a text string). As another example, an entity policy might mandate that a copyright notice must be placed in the upper corner of the last page of every document and a facet of that policy can describe that the copyright notice must have a value (e.g., a number for the year or a range of years). No users from that entity shall be able to change such policies that are enforced by the multi-stage configuration service.

Suppose a user identifies, in a transformation request, the entity policy that mandates watermarking confidential documents, but the user did not provide a text string. In this case, the multi-stage configuration service will create a key-value pair per the entity policy, but the value field would be empty because no text string was provided (in the entity policy or by the user). This empty field is a structural defect of the configuration file and, therefore, the multi-stage configuration service will generate an error report (120). Because a transformation job has not started, this error report can be communicated to the client system in mere seconds. The user can quickly fix the error by adding the required property value (which is a text string in this example) for the feature and resubmit the transformation request. In this way, the multi-stage configuration service can quickly and efficiently, before a transformation job is actually performed, notify a user at a client device that his transformation request contains an error or needs more information.

As described above, previously, the discovery of an unacceptable configuration is often delayed until after the document transformation has started with the configuration. Further, the application that performs the transformation has to alert the user (who often is not the creator of the configuration) that there is a problem with the configuration. The user often has to wait for a few minutes or hours for the application to report back that something is amiss.

The invention disclosed herein can significantly reduce this wait time. In some embodiments, this is enabled by a fast and lightweight microservices infrastructure, an example of which is shown in FIG. 2.

FIG. 2 depicts a diagrammatical representation of cloud computing environment 200 having microservices infrastructure 210 supporting a plurality microservices 230 running in cloud 220 to provide various microservices to client devices 251*a*, 251*b*, . . . , 251*n*. There could be hundreds of microservices 230, all of which can be stateless. Further, there could be thousands of publishing agents 235 (workers)

living in cloud 220. For the sake of brevity, in the example of FIG. 2, the plurality of microservices 230 can include multi-stage configuration service 231, publication service 233, publishing agent 235, and content storage service 237.

A user of user device 251*a* may upload an original source document to cloud computing environment 200 and request that the source document be transformed according to a certain policy. In some embodiments, multi-stage configuration service 231 can provide a frontend UI-based mechanism or tool for the user to discover (e.g., through a menu or a search function) available policies, create policies, and/or customize policies. In some embodiments, multi-stage configuration service 231 can provide a web form through which the user can specify what transformation policy to apply. In some embodiments, the transformation request can be communicated to multi-stage configuration service 231 through other means such as through a portal, by email, etc.

In some embodiments, multi-stage configuration service 231 can be part of a Representational State Transfer (REST) API layer of cloud 220. Multi-stage configuration service 231 can utilize the REST API transported over HyperText Transport Protocol (HTTP) or HTTP Secure (HTTPS). The grammar and protocol of this REST API is defined in microservices infrastructure 210. As an example, user device 251*a* can make a REST API call (e.g., using an HTTP request method such as HTTP GET) to the REST API of multi-stage configuration service 231 to learn about available policies. Likewise, to send a transformation request, user device 251*a* can make a REST API call (e.g., using a HTTP processing request method such as HTTP POST) to multi-stage configuration service 231, the call specifying a policy and input to that policy, if any (e.g., if the policy requires a watermark value).

In some embodiments, multi-stage configuration service 231 can be available through a web application or web site 263 running within a browser 261 on user device 251*a*. In such cases, a user indicates a policy and web application or web site 263 makes an HTTP call on behalf of the user. Multi-stage configuration service 231 receives the call, retrieves the policy from a policy store, determines whether it has everything the policy needs, and responds with what the indicated policy needs (e.g., two source files, a watermark string, etc.).

As described above, based at least on the policy, multi-stage configuration service 231 is operable to construct a multi-stage definition of a job. Once the concrete job description (i.e., a Config, which can be in the form of a configuration file) is constructed and verified as being structurally correct, the next step is to save it to be picked up by a publishing agent (e.g., publishing agent 235, which is another microservice running in cloud 200) when one becomes available. In some embodiments, for security and/or architectural reasons, multi-stage configuration service 231 can pass a valid or verified, structurally correct Config to another microservice (e.g., publication service 233) which performs the enqueuing operation. At this time, the configuration file is said to be enqueued. Physically, configuration files constructed by multi-stage configuration service 231 can be stored in an object-relational database management system (ORDBMS) 211. While FIG. 2 shows ORDBMS 211, ORDBMS 215, and ORDBMS 219, in some embodiments, only one ORDBM is necessary.

For each configuration file, an element is placed in a queue (e.g., by message broker 213) for one of publishing agents 235 to pick up. This element represents a transformation job ("job") to be performed by a publishing agent using an associated configuration file. An example of a suitable message broker can be one that implements the Advanced Message Queuing Protocol and that supports Streaming Text Oriented Messaging Protocol, Message Queuing Telemetry Transport, and other queuing protocols.

Publishing agents do not have REST APIs on them so they do not directly interact with client systems. Rather, they pick up jobs from a queue. Overtime, publishing agents can perform more and more operations (and thus have additional features such as support of additional output formats). There can be multiple queues for different types of publishing agents (e.g., a queue for version 1 transformation, a queue for version 2 transformation, etc.). A module can place or push a job onto an appropriate queue. If a single queue is used, a publishing agent may query a queue manager or a gateway whether the publishing agent is allowed for a particular job (e.g., whether the publishing agent has a license required to work on the particular job). If so, a job identifier is returned and the publishing agent can get the job from the queue using the job identifier.

In some embodiments, a single publishing agent is operable to pick up a job from a queue, a job description (i.e., a configuration file) for the job, and a source document (or source documents) specified by the job and performs all of the instructions in the job description. It starts from the top of the configuration file and loads source(s) indicated in the configuration file. If multiple sources residing at different storage locations are linked, it accesses those locations to load them into memory, stitches or merges them in memory, lays them out as appropriate, applies watermarks if required, etc., until all the key-value pairs in the configuration file have been processed.

The publishing agent then creates a rendition in a final output format (e.g., by taking the logically merged document and rendering a new output document from it). The new output document, which can be generated using an appropriate driver or output generator (e.g., via publication service 233), can be in any suitable final output format (e.g., PDF, Tagged Image File Format (TIFF), raster image format such as Joint Photographic Experts Group (JPEG or JPG), Portable Graphics Format (PNG), archive file format such as a zip file, proprietary file format, etc.).

The publishing agent determines where to put the output document (e.g., storing, through content storage service 237, in a block store or object-based cloud storage system or device 217 such as Swift from the OpenStack Object Store project) and what to do next (e.g., generating a notification and sending it to someone). If there is nothing else to do, the publishing agent is done with the job and it moves on to the next job.

The cost of getting that job incorrect is substantial because there could be a long time difference between when a job is requested to when the job is picked up. In this case, a user does not have to wait for a publishing agent to find out that the job does not work because the job is verified by multi-stage configuration service 231 before a publishing agent gets the job. That is, multi-stage configuration service 231 can verify and validate transformation jobs long before they are picked up by publishing agents 235 for processing. Because multi-stage configuration service 231 enqueues only those that are structurally correct, publishing agents 235 do not have to handle error reporting and/or slow down due to errors. This allows publishing agents 235 to work faster and more efficiently.

While the multi-stage configuration service provides a user with the ability to tailor an output (e.g., page orientation, page size, etc.), a novel feature here is that policies can be encoded with facets to constrain, limit, or even require a user's ability to tailor an output. As such, even though transformation options (properties of disparate features) are aplenty, a policy can dictate what properties can be used and how such properties can be used. By constructing a configuration file based at least on a policy (which includes properties of features associated with the policy) and checking the configuration file for structural correctness in accordance with the policy (which includes zero or more facets), the multi-stage configuration service dynamically automatically applies the policy to a document and enforces the policy before the document is actually transformed. The publishing agent that performs the actual transformation has all it needs to perform a correct transformation job and does not need to communicate with a user device.

Figure 3:
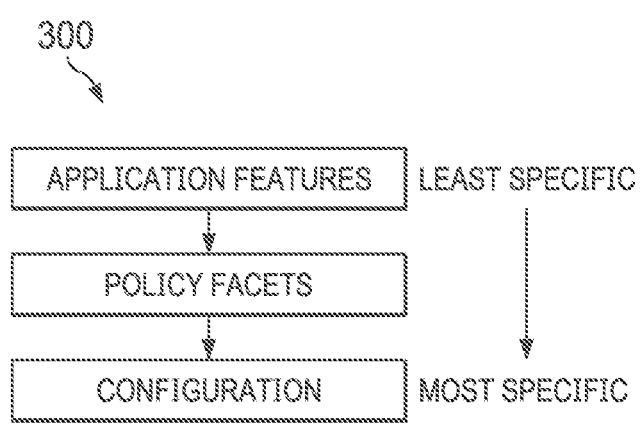
FIG. 3 depicts an example of a multi-stage process of creating a set of configuration properties according to some embodiments.

The generation of such a configuration file is a multi-stage process. FIG. 3 depicts an example of a multi-stage process 300 that allows refinement and increased specificity at each stage of the generation. First, application developers can specify an initial set of all possible values for application features. Next, an integration package can be used to constrain that set further in a policy. Finally, a user can "finalize" the configuration properties to specific, concrete values.

As described above, in this disclosure, facets describe what and how a feature's property value is constrained or set. For example, a facet of a policy might describe that, when verifying a configuration file against this policy, and the configuration file has an "Apply Watermark" instruction (e.g., has a key or property "watermark"), a value for that property must be provided. Because such a facet describes a relationship between a policy and a feature—what must be done, what must not be done, etc., no users can change this relationship. If they try, their transformation requests will be denied or rejected. In this way, a user can create policies and make certain constraints on how features are used.

The output of the process can be a set of configuration (feature property) values. The set of configuration values (which is referred to herein as a Config) would adhere to the rules and policies of the first two stages. That is, users can work with these data sets (i.e., "Application", "Feature," "Policy," and "Facet") and an appropriate Config will be created automatically for them.

This Config has the final key-value pairs that satisfied both the initial feature requirements (e.g., type, form, range) as well as any policy facet requirements (e.g., word change, extended, or not changed), providing an always-correct job-specific description of what a publishing agent will be doing. For any given day, there can be tens of thousands or millions of such Configs being created, one for each and every transformation request received by a multi-stage configuration service disclosed herein. Users no longer have to go through the relatively laborious, long, and complicated process of exhaustively defining each and every one of their requests and put them in a queue or send them to a transformation engine. Instead, they can indicate a policy that they would like to use, make none or one or two small differences for each transformation request, and get an immediate response if there is a problem (or be notified when a new output is generated). For example, if a web form is used and a form input field is missing a string value (or a value is out of range, a value not complying with a given feature schema, a value is changed but not allowed to change, a value is not changed but is required to change, etc.), a web application implementing a multi-stage configuration service disclosed herein can, in real time before submitting the web form to the backend, inform the user of the error so this error can be caught right away. This is a significantly streamlined process.

To indicate what policy they would like to use, users of a multi-stage configuration service disclosed herein do not need to consult a knowledge center or database or manual. Referring to FIG. 2, in some embodiments, policies can be created by an operator of cloud 220 and made available to users through a web application and/or UI hosted by a server machine operating in cloud 220. In some embodiments, policies can be created directly (e.g., by administrative users, application developers, etc.) through a web application and/or UI hosted by a server machine operating in cloud 220.

An entity can provide policies that have pre-set up configurations. For example, an entity can have a policy for privileged and confidential output. If a user uses the privileged and confidential output policy, the user will get whatever the entity has defined as privileged and confidential transformation. It might mean applying a banner or a watermark "confidential" across each page or it might mean inserting "privileged" in the upper right hand corner of a cover page, etc. The user does not even need to know what is in the privileged and confidential output policy. The user just needs to know that he needs to create a confidential rendition of this document and indicates that the transformation should apply the privileged and confidential output policy. Accordingly, if an organization's legal department or administration wants to set up a policy, they can set it up independently from the act of transformation. Everyone's document from that organization will have the policy applied during transformation.

As the above example illustrates, end users of a multi-stage configuration service disclosed herein can be shielded from the underlying logic of settings and facet values. Behind the scene, precedent rules (which are referred to herein as value selection rules) control how a user's overriding value gets blended into policy facets which are then blended into possibly default values defined by the application. Applying these value selection rules can manifest a logic flow for computing a final Config setting for a specific transformation request. For example, a value selection rule might define if an initial condition "No Setting" is met, then check if "No Path or Value," "Path Only," or "Path and Value." Different value selection rules may govern different initial conditions (e.g., "Setting in POST," "Setting in POST Different from Facet or Schema Default," "Setting in POST same as Facet or Schema Default," etc.). Suppose "Path Only" is met, different value selection rules may dictate how "Facet Change Policy" is applied.

For example, if a relevant facet is found in the policy and "Facet Change Policy" equals "Must," then a value selection rule may require returning "Facet Failure" because a value for a required property is missing. In this example, the policy requires a feature. However, no value has been provided in a request and the policy did not provide a default value either. Therefore, the transformation request is denied. The user can fix this problem and resubmit. As an implementation example, a decision engine (e.g., in a web application at the frontend or on a server machine at the backend) can be configured to apply implementation-specific precedent rules to make decisions on how to compute Configs based on policies.

As another example, if no relevant facet is found in the policy, different value selection rules may apply depending upon whether a feature is required or optional. If a feature is required, a value selection rule can require a determination on whether a feature schema associated with the feature requires a property. If the feature schema does require one, a value selection rule can require a determination on whether the feature schema has a default value for the required property. If the feature schema does not have a default value, the value selection rule specifies that "Schema Failure" is to be returned.

The feature schema itself can be selected, utilizing feature schema selection rules, from a plurality of feature schemas. This is because the same publishing agent might support multiple versions of a feature. For instance, an "Apply Watermark" feature may have two versions. One version allows the use of rich text and the other version does not. In such cases, when a user specifies a transformation request, the user needs to specify a rich text watermark. Utilizing feature schema selection rules, a key used by the multi-stage configuration service can be determined (e.g., "[setting namespace]@[setting name]," "[setting namespace]@[setting name]@[app version]," etc.) and, from there, the content of the resulting final Config can be obtained so that a publishing agent knows how to select its behavior and performs its job accordingly.

FIGS. 4A-4B are charts showing examples of feature schema selection rules utilized by a multi-stage configuration service disclosed herein according to some embodiments. In some embodiments, which feature schema to use can depend on whether a version range setting is provided, whether no versions, a single version, or multiple versions of a policy is/are specified, or whether no versions, a single version, or multiple versions of an application is/are specified, etc. As illustrated in FIG. 4A, in some embodiments, if no versions of an application are specified, different feature schema selection rules may apply depending upon whether no versions, a single version, or multiple versions of the multi-stage configuration service itself is/are specified. Such feature schema selection rules can be implementation-specific. For instance, in some embodiments, versioning of a multi-stage configuration service need not be used to implement feature schema selection rules, as illustrated in FIG. 4B.

The invention disclosed herein provide several advantages. For example, as described above, previously, configuring a transformation can be an involved, tedious, error-prone, and complicated process. The end result is often a static configuration file that cannot be dynamically changed "in-process" or reused for another transformation. A policy-driven transformation approach disclosed herein eliminates the need to create individual static configuration files and allows entities to set up policies. The invention allows a user of a client system to provide and/or select policies, aggregate them together, and greatly streamline or minimize what the client system performs in terms of the act of transformation. For example, a policy by an entity (e.g., an operator of a client system that utilizes a multi-stage configuration service disclosed herein) can dictate that a watermark must be placed in everything that is being transformed for the entity, regardless of the source system from where the file comes and regardless of the target system where the file is going. This kind of policy can be reused in every individual transformation act that is performed on behalf of the entity. As another example of a streamlined client-side operation, a user can request a multi-stage configuration service disclosed herein to transform a file per a standard policy XYZ external distribution ABC with a legal provision added to the file per a custom policy 123. In this example, that's all the user needs to specify in a transformation request.

Through the multi-stage process of creating a set of configuration properties, the invention provides a self-documenting description of an application's potential configuration properties, including their acceptable forms and values. This description provides the necessary know-how's to a publishing agent on how to perform a transformation. Further, the invention allows intermediate agents to setup multiple subsets of an application's total configurable space, tailored to specific usages. Moreover, it affords the ability to know, in advance of the actual usage/deployment of the configuration options, whether those options are satisfactory to both the initial application requirements as well as the intermediate policy's requirements.

Figure 5:
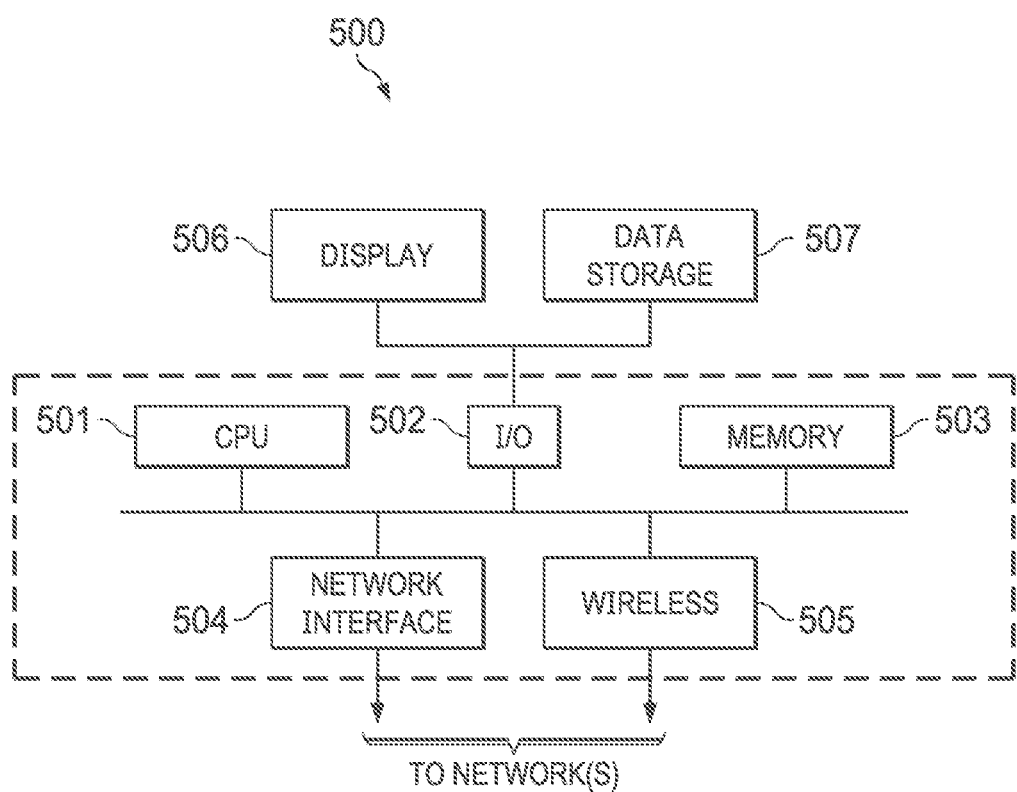
FIG. 5 depicts a diagrammatic representation of a data processing system for implementing a multi-stage configuration service disclosed herein according to some embodiments.

FIG. 5 depicts a diagrammatic representation of a data processing system for implementing a method disclosed herein. As shown in FIG. 5, data processing system 500 may include one or more central processing units (CPU) or processors 501 coupled to one or more user input/output (I/O) devices 502 and memory devices 503.

Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc.

Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 905, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as LAN, WAN, and/or the Internet. In a distributed computing environment, program modules or subroutines may be located in both local and remote memory storage devices. These program modules or subroutines may for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a non-transitory computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved in many ways. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine-readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes a hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A system, comprising:
    a cloud computing environment having a microservices infrastructure supporting a plurality microservices including a publishing agent, a queue, and a multi-stage configuration service configured for:
        receiving, from a client device, a transformation request that specifies a policy and that identifies a source document;
        retrieving the policy from a policy store, wherein the policy describes how an application feature is set or constrained in performing a document transformation;
        constructing a multi-stage job definition based at least on the policy;
        verifying whether the multi-stage job definition is structurally correct; and
        once the multi-stage job definition is verified as being structurally correct, placing an element that references the multi-stage job definition in the queue, the element representing a transformation job for performing the document transformation specified in the policy on the source document identified in the transformation request, wherein the publishing agent picks up the element from the queue and performs the transformation job utilizing the multi-stage job definition.

2. The system of claim 1, wherein the multi-stage job definition contains key-value pairs representing settings of the transformation job.

3. The system of claim 2, wherein the settings are set or constrained in accordance with zero or more facets of the policy, each facet describing how a transformation feature is set or constrained in performing the transformation job.

4. The system of claim 1, wherein the transformation request further specifies input for the policy, the input comprising a value required by the policy.

5. The system of claim 1, wherein the multi-stage configuration service is further configured for providing a web form for specifying the policy.

6. The system of claim 1, wherein the microservices infrastructure further comprises an object-relational database management system and wherein the multi-stage configuration service is further configured for storing the multi-stage job definition in the object-relational database management system.

7. The system of claim 1, wherein the transformation request is received from a user device through an application programming interface call to the multi-stage configuration service as defined by the microservices infrastructure.

8. A method, comprising:
    receiving, by a multi-stage configuration service from a client device, a transformation request that specifies a policy and that identifies a source document, the multi-stage configuration service being supported by a microservices infrastructure of a cloud computing environment;
    retrieving, by the multi-stage configuration service, the policy from a policy store, wherein the policy describes how an application feature is set or constrained in performing a document transformation;
    constructing, by the multi-stage configuration service, a multi-stage job definition based at least on the policy;
    verifying, by the multi-stage configuration service, whether the multi-stage job definition is structurally correct; and
    once the multi-stage job definition is verified as being structurally correct, placing, by the multi-stage configuration service, an element that references the multi-stage job definition in a queue, the element representing a transformation job for performing the document transformation specified in the policy on the source document identified in the transformation request, wherein a publishing agent picks up the element from the queue and performs the transformation job utilizing the multi-stage job definition.

9. The method according to claim 8, wherein the multi-stage job definition contains key-value pairs representing settings of the transformation job.

10. The method according to claim 9, wherein the settings are set or constrained in accordance with zero or more facets of the policy, each facet describing how a transformation feature is set or constrained in performing the transformation job.

11. The method according to claim 8, wherein the transformation request further specifies input for the policy, the input comprising a value required by the policy.

12. The method according to claim 8, wherein the multi-stage configuration service is further configured for providing a web form for specifying the policy.

13. The method according to claim 8, wherein the microservices infrastructure further comprises an object-relational database management system and wherein the multi-stage configuration service is further configured for storing the multi-stage job definition in the object-relational database management system.

14. The method according to claim 8, wherein the transformation request is received from a user device through an application programming interface call to the multi-stage configuration service as defined by the microservices infrastructure.

15. A computer program product comprising a non-transitory computer-readable medium storing instructions translatable by a processor for implementing a multi-stage configuration service in a cloud computing environment, the multi-stage configuration service configured for:
    receiving, from a client device, a transformation request that specifies a policy and that identifies a source document;
    retrieving the policy from a policy store, wherein the policy describes how an application feature is set or constrained in performing a document transformation;

constructing a multi-stage job definition based at least on the policy;

verifying whether the multi-stage job definition is structurally correct; and once the multi-stage job definition is verified as being structurally correct, placing an element that references the multi-stage job definition in a queue, the element representing a transformation job for performing the document transformation specified in the policy on the source document identified in the transformation request, wherein a publishing agent picks up the element from the queue and performs the transformation job utilizing the multi-stage job definition.

16. The computer program product of claim 15, wherein the multi-stage job definition contains key-value pairs representing settings of the transformation job.

17. The computer program product of claim 16, wherein the settings are set or constrained in accordance with zero or more facets of the policy, each facet describing how a transformation feature is set or constrained in performing the transformation job.

18. The computer program product of claim 15, wherein the transformation request further specifies input for the policy, the input comprising a value required by the policy.

19. The computer program product of claim 15, wherein the multi-stage configuration service is further configured for providing a web form for specifying the policy.

20. The computer program product of claim 15, wherein the microservices infrastructure further comprises an object-relational database management system and wherein the multi-stage configuration service is further configured for storing the multi-stage job definition in the object-relational database management system.

* * * * *